(12) United States Patent
Zhang

(10) Patent No.: US 8,789,733 B2
(45) Date of Patent: Jul. 29, 2014

(54) SUPPORTING DEVICE OF INTELLIGENT TERMINAL EQUIPMENT AND SUPERMARKET SHOPPING CART

(71) Applicant: China Human International Technology Co., LTD., Beijing (CN)

(72) Inventor: Jianqiang Zhang, Beijing (CN)

(73) Assignee: China Human International Technology Co., Ltd., Beijing (CN)

( * ) Notice: Subject to any disclaimer, the term of this patent is extended or adjusted under 35 U.S.C. 154(b) by 0 days.

(21) Appl. No.: 13/777,073

(22) Filed: Feb. 26, 2013

(65) Prior Publication Data

US 2013/0168426 A1    Jul. 4, 2013

Related U.S. Application Data

(63) Continuation-in-part of application No. 13/143,847, filed as application No. PCT/CN2009/074135 on Sep. 23, 2009, now abandoned.

(30) Foreign Application Priority Data

Jan. 22, 2009   (CN) .................... 2009 2 0005102 U

(51) Int. Cl.
   *B62B 5/00*   (2006.01)
   *B60R 11/02*  (2006.01)
   *B62B 3/14*   (2006.01)
(52) U.S. Cl.
   CPC ............ *B62B 3/1428* (2013.01); *Y10S 224/929* (2013.01)
   USPC ....................... 224/411; 224/929; 280/33.992
(58) Field of Classification Search
   USPC .......................... 224/411, 420, 453, 452, 929; 280/33.992
   See application file for complete search history.

(56) References Cited

U.S. PATENT DOCUMENTS

| 1,375,752 A | 4/1921 | Green |
| 1,417,223 A | 5/1922 | Anderson |
| 2,888,761 A * | 6/1959 | Miller .............................. 40/308 |

(Continued)

FOREIGN PATENT DOCUMENTS

| CN | 2928080 Y | 8/2007 |
| CN | 201102560 Y | 8/2008 |
| CN | 201343056 Y | 11/2009 |

OTHER PUBLICATIONS

International Search Report regarding Application No. PCT/CN2009/074135, mailed Dec. 31, 2009.

(Continued)

*Primary Examiner* — Justin Larson
(74) *Attorney, Agent, or Firm* — Harness, Dickey & Pierce, P.L.C.

(57) ABSTRACT

An intelligent terminal equipment supporting device and a supermarket shopping cart provided with the supporting device are disclosed. The intelligent terminal equipment supporting device includes a mounting member, a first supporting member and a second supporting member. A rear end of the first supporting member is fixedly connected with a front side of the mounting member, a rear end of the second supporting member is fixedly connected with the front side of the mounting member, a first supporting joint member is connected between the front end of the first supporting member and the front end of the second supporting member, and the first supporting member, the second supporting member and the first supporting joint member form a frame structure to support the intelligent terminal equipment.

8 Claims, 3 Drawing Sheets

(56) References Cited

U.S. PATENT DOCUMENTS

| | | | |
|---|---|---|---|
| 3,598,295 A | | 8/1971 | Seegers |
| 4,191,393 A | * | 3/1980 | Niemann ................. 224/448 |
| 4,339,060 A | | 7/1982 | Braida, Jr. |
| 4,685,701 A | * | 8/1987 | Amundson et al. ............ 281/42 |
| D306,150 S | * | 2/1990 | Macke ....................... D12/407 |
| 4,968,047 A | | 11/1990 | Ferris |
| 5,494,306 A | | 2/1996 | Adamson et al. |
| 5,636,818 A | | 6/1997 | Edwards et al. |
| 6,076,791 A | * | 6/2000 | Rand et al. ............. 248/229.24 |
| 6,957,755 B2 | * | 10/2005 | Mahoney et al. ............ 224/413 |
| 7,065,319 B1 | * | 6/2006 | Hartley .................... 434/307 R |
| 7,147,137 B2 | | 12/2006 | Schanz et al. |
| 7,219,901 B2 | | 5/2007 | Ryan |
| 7,475,884 B2 | | 1/2009 | Ryan |
| 7,503,573 B2 | | 3/2009 | Finlaw et al. |
| 8,152,062 B2 | * | 4/2012 | Perrier et al. ................. 235/383 |
| 8,474,832 B2 | * | 7/2013 | Mersky .................... 280/33.992 |
| 2002/0153706 A1 | | 10/2002 | Yonge et al. |
| 2002/0194075 A1 | * | 12/2002 | O'Hagan et al. ................. 705/21 |
| 2005/0258208 A1 | * | 11/2005 | Pickett .......................... 224/427 |
| 2007/0085283 A1 | | 4/2007 | Ryan |
| 2012/0161406 A1 | | 6/2012 | Mersky |

OTHER PUBLICATIONS

U.S. Office Action regarding U.S. Appl. No. 13/143,847, mailed Jul. 17, 2012.

U.S. Final Office Action regarding U.S. Appl. No. 13/143,847, mailed Nov. 26, 2012.

* cited by examiner

SUPPORTING DEVICE OF INTELLIGENT TERMINAL EQUIPMENT AND SUPERMARKET SHOPPING CART

CROSS-REFERENCE TO RELATED APPLICATIONS

This application is a continuation-in-part of U.S. patent application Ser. No. 13/143,847, filed on Jul. 8, 2011 which is a 371 U.S. National Stage of International Application No. PCT/CN2009/074135, filed Sep. 23, 2009, which claims the benefit of Chinese patent application No. 200920005102.7 titled "SUPPORTING DEVICE OF INTELLIGENT TERMINAL EQUIPMENT AND SUPERMARKET SHOPPING CART", filed with the Chinese State Intellectual Property Office on Jan. 22, 2009. The entire disclosures of the above applications are incorporated herein by reference.

TECHNICAL FIELD OF THE INVENTION

The present application relates to a technical field of shopping carts, particularly to a supporting device for an intelligent terminal equipment and a supermarket shopping cart.

BACKGROUND OF THE INVENTION

In many large supermarkets, a shopping cart is provided with an intelligent terminal equipment which can provide various services for the customers to facilitate the shopping of the customers. When the customers do shopping with the shopping cart, the intelligent terminal equipment on the shopping cart can help customers inquire the position of the commodity, provide an intelligent navigation, inquire the price of the commodity, inquire the quality information of the commodity and the information relating to the commodity and the like; and also can complete payment via an electronic wallet; and can also play video advertisements of current commodities on the counters automatically and provide statistics of the played number of the video advertisements.

Due to the weight of the intelligent terminal equipment, when installing the intelligent terminal equipment onto the shopping cart, it is necessary to provide a device for supporting and fixing the intelligent terminal equipment on the cart body of the supermarket shopping cart. In the prior method, generally, it is necessary to rebuild a new cart body, on which a structure for supporting and fixing the intelligent terminal equipment is provided. Thus, in this method, the manufacturing cost is increased due to the rebuilt cart body.

SUMMARY OF THE INVENTION

In view of the above disadvantage in the prior art, that is, when the intelligent terminal equipment is installed on the supermarket shopping cart, the manufacturing cost is increased since it is necessary to rebuild a new cart body, the present application provides a supporting device for an intelligent terminal equipment.

An intelligent terminal equipment supporting device includes a mounting member, a first supporting member and a second supporting member, wherein the mounting member, the first supporting member and the second supporting member are located in the same plane, and the first supporting member and the second supporting member are both of a bending structure, a distance between a rear end of the first supporting member and a rear end of the second supporting member is smaller than a distance between a front end of the first supporting member and a front end of the second supporting member, the rear end of the first supporting member is fixedly connected with a front side of the mounting member, the rear end of the second supporting member is fixedly connected with the front side of the mounting member, a first supporting joint member is connected between the front end of the first supporting member and the front end of the second supporting member, and the first supporting member, the second supporting member and the first supporting joint member form a frame structure to support the intelligent terminal equipment.

Preferably, the first supporting member includes a front portion, a middle portion and a rear portion; the rear portion of the first supporting member extends upwardly in a direction vertical to an axis of the mounting member, and includes a rear end fixedly connected to a front side of the mounting member; the middle portion of the first supporting member extends leftwardly and inclinedly from a front end of the rear portion of the first supporting member; and the front portion of the first supporting member extends upwardly in a direction vertical to the axis of the mounting member, thereby forming the bending structure of the first supporting member; the second supporting member includes a front portion, a middle portion and a rear portion; the rear portion of the second supporting member extends upwardly in a direction vertical to the axis of the mounting member, and includes a rear end fixedly connected to the front side of the mounting member; the middle portion of the second supporting member extends rightwardly and inclinedly from a front end of the rear portion of the second supporting member; and the front portion of the second supporting member extends upwardly in a direction vertical to the axis of the mounting member, thereby forming the bending structure of the second supporting member; and a distance between the rear portion of the first supporting member and the rear portion of the second supporting member is smaller than a distance between the front portion of the first supporting member and the front portion of the second supporting member.

Preferably, the first supporting joint member is a steel sheet, and includes two ends respectively welded onto a lower surface of the front portion of the first supporting member and a lower surface of the front portion of the second supporting member.

Preferably, the first supporting member and the second supporting member are both square steel tubes.

Preferably, the mounting member is a standard handle for the supermarket shopping cart.

Preferably, a second supporting joint member is connected between the rear portion of the first supporting member and the rear portion of the second supporting member.

Preferably, the second supporting joint member is a steel sheet, and two ends of an upper side of the second supporting joint member are respectively welded to a lower end of the rear portion of the first supporting member and a lower end of the rear portion of the second supporting member, and the second supporting joint member is vertical to the plane where the first supporting member, the second supporting member and the mounting member are located.

Preferably, a rear end of the rear portion of the first supporting member is fixed with the front side of the mounting member by welding, and a rear end of the rear portion of the second supporting member is fixed with the front side of the mounting member by welding.

A supermarket shopping cart includes the above intelligent terminal equipment supporting device, and the mounting member is installed at a handle of the supermarket shopping cart.

The supporting device for the intelligent terminal equipment according to the present application includes a mounting member, a first supporting member, a second supporting member and a first supporting joint member. The first supporting member and the second supporting member are fixedly connected to the mounting member. The first supporting member, the second supporting member and the first supporting joint member are used to support the intelligent terminal equipment. Among constituting parts of the cart body of the supermarket shopping cart, most of them are connected by welding, except that the handle is connected to the cart body by screws and plastic bayonets. Thus, the handle can be disassembled from the cart body by loosing the screws and the plastic bayonets. In view of this, the present application performs a modification to the handle, that is, the first supporting member, the second supporting member and the first supporting joint member, which perform the supporting function, are fixedly connected onto the standard handle, so as to constitute the supporting device of the intelligent terminal equipment. The supporting device of the intelligent terminal equipment is mounted at the handle of the supermarket shopping cart and the plastic bayonets and screws are then fastened, in this way, the modification to the supermarket shopping cart is accomplished. It is unnecessary for this configuration to rebuild a new cart body, thereby having a low manufacturing cost.

The intelligent terminal equipment may be fixed onto the frame structure formed by the first supporting member, the second supporting member and the first supporting joint member. A display screen of the intelligent terminal equipment is perpendicular to the sight line of the consumer. Thus when pushing the supermarket shopping cart, the customer can see the display screen comfortably by naturally lowering his head. Since a keyboard of the intelligent terminal equipment is disposed close to the handle, when pushing the supermarket shopping cart, the customer can press the keyboard by moving his hand in a minimum distance without affecting the holding of the handle.

In a preferred technical solution, the second supporting joint member for fixing the first supporting member and the second supporting member is welded between the rear portion of the first supporting member and the rear portion of the second supporting member. The second supporting joint member is connected to a steel bar of the upper edge of the back portion of the cart body of the supermarket shopping cart with screws and connecting bayonets. The steel bar of the upper edge of the back portion of the cart body has elasticity, and with this elasticity, the supporting device of the intelligent terminal equipment has an anti-vibration capacity which can protect the intelligent terminal equipment effectively. Besides, since the second supporting joint member is fixed on the upper edge of the back portion of the cart body, the second supporting joint member may support the first supporting member and the second supporting member in a vertical direction.

The present application further provides a supermarket shopping cart installed with the above-mentioned supporting device of the intelligent terminal equipment. Since the above-mentioned supporting device of the intelligent terminal equipment has the above-mentioned technical effects, the supermarket shopping cart installed with the supporting device of the intelligent terminal equipment also has the above-mentioned technical effects.

Figure 1:
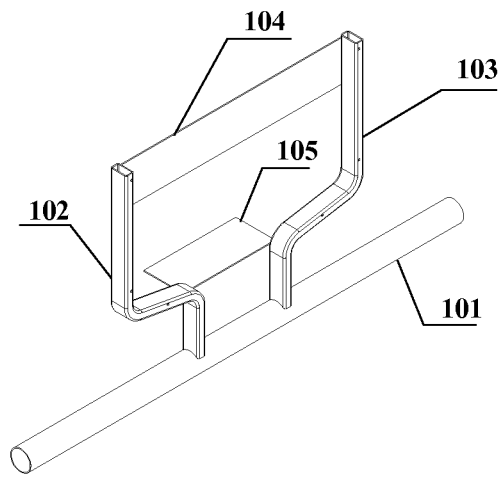
FIG. 1 is a perspective view of a supporting device of an intelligent terminal equipment according to a first embodiment of the present application.

Reference numerals in FIGS. 1 to 6:

| | |
|---|---|
| 101. mounting member, | 102. first supporting member, |
| 1021 front portion of the first supporting member, | |
| 1022 middle portion of the first supporting member, | |
| 1023 rear portion of the first supporting member, | |
| 103. second supporting member, | |
| 1031 front portion of the second supporting member, | |
| 1032 middle portion of the second supporting member, | |
| 1033 rear portion of the second supporting member, | |
| 104. first supporting joint member, | 105. second supporting joint member; |
| 201. mounting member, | 202. first supporting member, |
| 203. second supporting member, | 204. first supporting joint member, |
| 205. second supporting joint member. | |

DETAILED DESCRIPTION OF THE INVENTION

The present application will be described hereinafter in conjunction with drawings. The following description is only demonstrative and explanatory, and should not be deemed to limit the protection scope of the present application.

Figure 2:
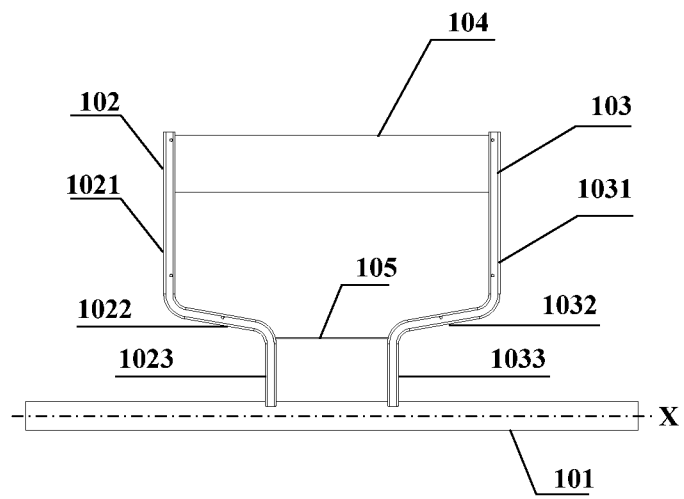
FIG. 2 is a front view of the supporting device of the intelligent terminal equipment according to the first embodiment of the present application.
Figure 3:
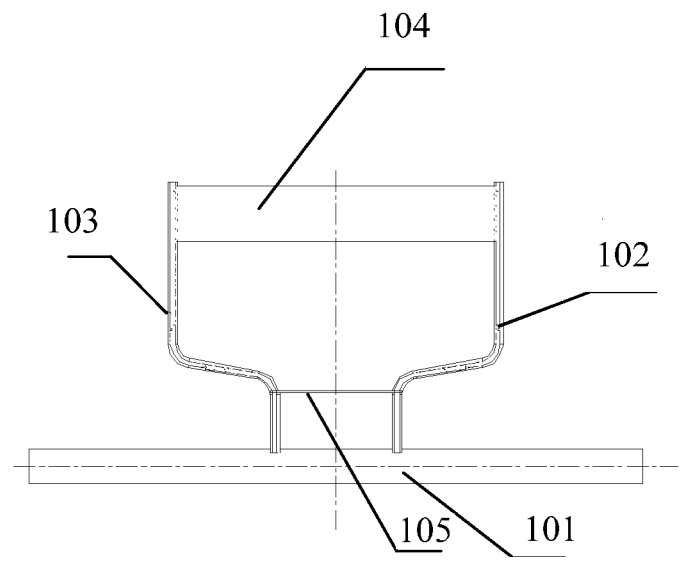
FIG. 3 is a rear view of the supporting device of the intelligent terminal equipment according to the first embodiment of the present application.
Figure 4:
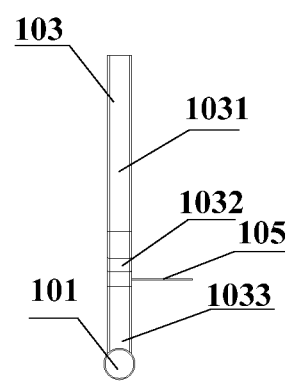
FIG. 4 is a right view of the supporting device of the intelligent terminal equipment according to the first embodiment of the present application.
Figure 5:
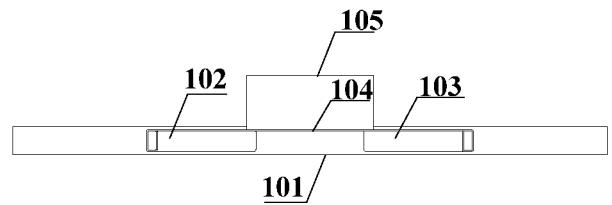
FIG. 5 is a top view of the supporting device of the intelligent terminal equipment according to the first embodiment of the present application.

Referring to FIGS. 1 to 5, FIG. 1 is a perspective view of a supporting device of an intelligent terminal equipment according to a first embodiment of the present application; FIG. 2 is a front view of the supporting device of the intelligent terminal equipment according to the first embodiment of the present application; FIG. 3 is a rear view of the supporting device of the intelligent terminal equipment according to the first embodiment of the present application; FIG. 4 is a right view of the supporting device of the intelligent terminal equipment according to the first embodiment of the present application; and FIG. 5 is a top view of the supporting device of the intelligent terminal equipment according to the first embodiment of the present application.

As shown in FIG. 1, the supporting device of the intelligent terminal equipment includes a mounting member 101, a first supporting member 102, a second supporting member 103, a first supporting joint member 104 and a second supporting joint member 105. The mounting member 101 is a standard handle cooperated with a cart body of a supermarket shopping cart. The first supporting member 102 and the second supporting member 103 are bent square steel tubes. The first supporting joint member 104 and the second supporting joint member 105 are steel sheets.

Referring to FIGS. 2 to 5, the first supporting member 102 and the second supporting member 103 are both of a bending structure, and are both located in the same plane with the mounting member 101. Specifically, the first supporting member 102 includes a front portion 1021, a middle portion 1022 and a rear portion 1023; the rear portion 1023 of the first supporting member 102 extends upwardly in a direction vertical to an axis X of the mounting member 101, and a rear end of the rear portion 1023 is fixedly connected to a front side of the mounting member 101; the middle portion 1022 of the first supporting member 102 extends leftwardly and inclinedly from a front end of the rear portion 1023 of the first supporting member 102; and the front portion 1021 of the first supporting member 102 extends upwardly in a direction vertical to the axis X of the mounting member 101, i.e. the front portion 1021 is parallel to the rear portion 1023, thereby forming the bending structure of the first supporting member 102. Similarly, the second supporting member 103 includes a front portion 1031. a middle portion 1032 and a rear portion 1033; the rear portion 1033 of the second supporting member 103 extends upwardly in a direction vertical to the axis X of the mounting member 101, and a rear end of the rear portion 1033 is fixedly connected to the front side of the mounting member 101; the middle portion 1032 of the second supporting member 103 extends rightwardly and inclinedly from a front end of the rear portion 1033 of the second supporting member 103; and the front portion 1031 of the second supporting member 103 extends upwardly in a direction vertical to the axis X of the mounting member 101, i.e. the front portion 1031 is parallel to the rear portion 1033, thereby forming the bending structure of the second supporting member 103. Thus, the front portion 1021 of the first supporting member 102 is parallel to the front portion 1031 of the second supporting member 103, and the rear portion 1023 of the first supporting member 102 is parallel to the rear portion 1033 of the second supporting member 103.

Specifically, a rear end of the rear portion 1023 of the first supporting member 102 is fixed with the front side of the mounting member 101 by welding, and a rear end of the rear portion 1033 of the second supporting member 103 is fixed with the front side of the mounting member 101 by welding. The first supporting member 102 and the second supporting member 103 are both of a bending structure. A distance between the rear portion 1023 of the first supporting member 102 and the rear portion 1033 of the second supporting member 103 is smaller than a distance between the front portion 1021 of the first supporting member 102 and the front portion 1031 of the second supporting member 103. The first supporting joint member 104 is welded between the front portion 1021 of the first supporting member 102 and the front portion 1031 of the second supporting member 103, such that a frame structure is formed by the first supporting joint member 104, the first supporting member 102 and the second supporting member 103 for supporting the intelligent terminal equipment. The second supporting joint member 105 is welded between the rear portion 1023 of the first supporting member 102 and the rear portion 1033 of the second supporting member 103.

Specifically, referring to FIGS. 2 and 3, the first supporting joint member 104 is a steel sheet, and two ends of the first supporting joint member 104 are respectively welded to a lower surface of the front portion 1021 of the first supporting member 102 and a lower surface of the front portion 1031 of the second supporting member 103. Referring to FIG. 4, the second supporting joint member 105 is a steel sheet, two ends of an upper side of the second supporting joint member 105 are respectively welded to a lower end of the rear portion 1023 of the first supporting member 102 and a lower end of the rear portion 1033 of the second supporting member 103, and the second supporting joint member 105 is vertical to the plane where the first supporting member 102, the second supporting member 103 and the mounting member 101 are located. A lower side of the second supporting joint member 105 is connected to a steel bar of the upper edge of the back portion of the cart body of the supermarket shopping cart with screws and connecting bayonets so as to support the first supporting member 102 and the second supporting member 103.

The advantages of the supporting device of the intelligent terminal equipment are presented as follows.

Among constituting parts of the cart body of the supermarket shopping cart, most of them are connected by welding, except that the handle is connected to the cart body by screws and plastic bayonets. Thus, the handle can be disassembled from the cart body by loosing the screws and the plastic bayonets. In view of this, the present application performs a modification to the handle, that is, the first supporting member 102, the second supporting member 103, the first supporting joint member 104 and the second supporting joint member 105 which perform the supporting function are fixedly connected onto the standard handle, so as to constitute the supporting device of the intelligent terminal equipment. The supporting device of the intelligent terminal equipment is mounted at the handle of the supermarket shopping cart and the plastic bayonets and screws are then fastened, in this way, the modification to the supermarket shopping cart is accomplished. It is unnecessary for this configuration to rebuild a new cart body, thereby having a low manufacturing cost.

The intelligent terminal equipment may be fixed onto the frame structure formed by the first supporting member 102, the second supporting member 103 and the first supporting joint member 104. A display screen of the intelligent terminal equipment is disposed perpendicular to the sight line of the consumer. Thus, when pushing the supermarket shopping cart, the customer can see the display screen comfortably by naturally lowering his head. Since a keyboard of the intelligent terminal equipment is disposed close to the handle, when pushing the supermarket shopping cart, the customer can press the keyboard by moving his hand in a minimum distance without affecting the holding of the handle.

In a preferred technical solution, the second supporting joint member 105 for fixing the first supporting member 102 and the second supporting member 103 is welded between the rear portion 1023 of the first supporting member 102 and the rear portion 1033 of the second supporting member 103. The second supporting joint member 105 is connected to a steel bar of the upper edge of the back portion of the cart body of the supermarket shopping cart with screws and connecting bayonets. The steel bar of the upper edge of the back portion of the cart body has elasticity, and with this elasticity, the supporting device of the intelligent terminal equipment has an anti-vibration capacity which can protect the intelligent terminal equipment effectively. Besides, since the second supporting joint member 105 is fixed on the upper edge of the back portion of the cart body, the second supporting joint member 105 may support the first supporting member 102 and the second supporting member 103 in a vertical direction.

In the above embodiment, the first supporting member and the second supporting member are both bent square steel tubes. Alternatively, the first supporting member and the second supporting member may be straight square steel tubes. Both of the above structures fall within the protection scope of the present application. The latter structure will be briefly described in the second embodiment of the present application.

Figure 6:
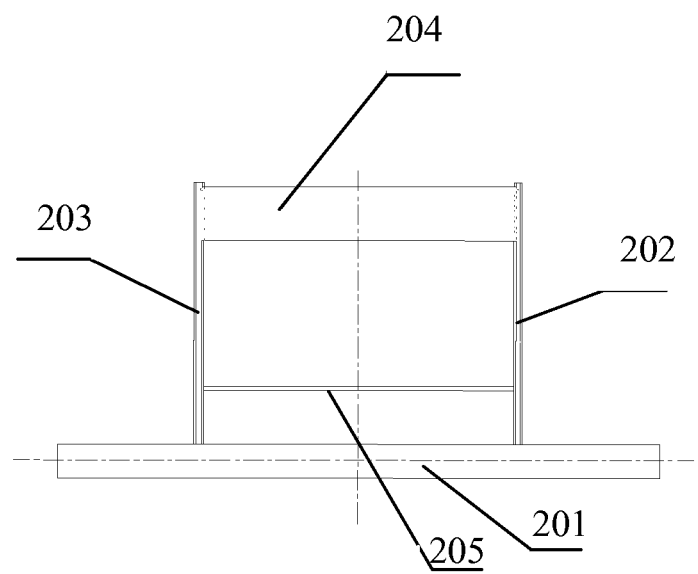
FIG. 6 is a rear view of a supporting device for an intelligent terminal equipment according to a second embodiment of the present application.

Referring to FIG. 6, a rear view of a supporting device of an intelligent terminal equipment according to the second embodiment of the present application is shown.

As shown in FIG. 6, the supporting device of the intelligent terminal equipment includes a mounting member 201, a first supporting member 202, a second supporting member 203, a first supporting joint member 204 and a second supporting joint member 205. The mounting member 201 is a standard handle cooperated with a cart body of a supermarket shopping cart. The first supporting member 202 and the second supporting member 203 are straight square steel tubes. The first supporting joint member 204 and the second supporting joint member 205 are steel sheets.

The back end of the first supporting member 202 is fixed with the front side of the mounting member 201 by welding, and the back end of the second supporting member 203 is fixed with the front side of mounting member 201 by welding. The first supporting member 202 and the second supporting member 203 are both straight square steel tubes and are disposed in parallel, and are both located in the same plane with the mounting member 201. The first supporting joint member 204 for supporting the intelligent terminal equipment is welded between the front end of the first supporting member 202 and the front end of the second supporting member 203, and the second supporting joint member 205 is welded between the back end of the first supporting member 202 and the back end of the second supporting member 203.

The other details are similar to that in the first embodiment, and thus will not be described in detail herein.

In the above embodiments, the material of the first supporting member and the second supporting member is square steel tube, but any metal material with relatively high strength can be used to make the first supporting member and the second supporting member. These structures fall within the protection scope of the present application.

In the above embodiments, the supporting device of the intelligent terminal equipment is formed by separate members such as the first supporting member, the second supporting member, the first supporting joint member and the second supporting joint member etc. Alternatively, the supporting device of the intelligent terminal equipment according to the application may also be formed as an integral structure by casting with a mold. The two structures fall within the protection scope of the present application.

The present application further provides a supermarket shopping cart installed with the above-mentioned supporting device of the intelligent terminal equipment. Since the above-mentioned supporting device of the intelligent terminal equipment has the above-mentioned technical effects, the supermarket shopping cart installed with the supporting device of the intelligent terminal equipment also has the above-mentioned technical effects, which will not be described in detail herein.

The above description is only the preferred embodiments of the present application. It should be noted that, due to the limitation of the written expression and limitless concrete structures, for the person skilled in the art, many improvements and modifications may be made without departing from the principle of the present application and these improvements and modifications should be deemed to fall into the protection scope of the present application.

The invention claimed is:

1. An intelligent terminal equipment supporting device, comprising a mounting member, a first supporting member and a second supporting member, wherein the entire mounting member, the entire first supporting member and the entire second supporting member are located in the same plane, and the first supporting member and the second supporting member are both of a bending structure; a distance between a rear end of the first supporting member and a rear end of the second supporting member is smaller than a distance between a front end of the first supporting member and a front end of the second supporting member; the rear end of the first supporting member is fixedly connected with a front side of the mounting member, and the rear end of the second supporting member is fixedly connected with the front side of the mounting member; a first supporting joint member is connected between the front end of the first supporting member and the front end of the second supporting member; a second supporting joint member is connected between the rear end of the first supporting member and the rear end of the second supporting member; and the first supporting member, the second supporting member and the first supporting joint member form a frame structure to support the intelligent terminal equipment.

2. The intelligent terminal equipment supporting device according to claim 1, wherein the mounting member is a standard handle for a supermarket shopping cart.

3. The intelligent terminal equipment supporting device according to claim 1, wherein the second supporting joint member is a steel sheet, and two ends of an upper side of the second supporting joint member are respectively welded to a lower end of the rear portion of the first supporting member and a lower end of the rear portion of the second supporting member, and the second supporting joint member is vertical to the plane where the first supporting member, the second supporting member and the mounting member are located.

4. A supermarket shopping cart, comprising the intelligent terminal equipment supporting device as claimed in claim 1, wherein the mounting member is installed at a handle of the supermarket shopping cart.

5. The intelligent terminal equipment supporting device according to claim 1, wherein the first supporting member comprises a front portion, a middle portion and a rear portion; the rear portion of the first supporting member extends upwardly in a direction vertical to an axis of the mounting member, and comprises a rear end fixedly connected to a front side of the mounting member; the middle portion of the first supporting member extends leftwardly and inclinedly from a front end of the rear portion of the first supporting member; and the front portion of the first supporting member extends upwardly in a direction vertical to the axis of the mounting member, thereby forming the bending structure of the first supporting member; the second supporting member comprises a front portion, a middle portion and a rear portion; the rear portion of the second supporting member extends upwardly in a direction vertical to the axis of the mounting member, and comprises a rear end fixedly connected to the front side of the mounting member; the middle portion of the second supporting member extends rightwardly and inclinedly from a front end of the rear portion of the second supporting member; and the front portion of the second supporting member extends upwardly in a direction vertical to the axis of the mounting member, thereby forming the bending structure of the second supporting member; and a distance between the rear portion of the first supporting member and the rear portion of the second supporting member is smaller than a distance between the front portion of the first supporting member and the front portion of the second supporting member.

6. The intelligent terminal equipment supporting device according to claim 5, wherein the first supporting joint member is a steel sheet, and comprises two ends respectively welded onto a lower surface of the front portion of the first supporting member and a lower surface of the front portion of the second supporting member.

7. The intelligent terminal equipment supporting device according to claim 5, wherein the first supporting member and the second supporting member are both square steel tubes.

8. The intelligent terminal equipment supporting device according to claim 5, wherein a rear end of the rear portion of the first supporting member is fixed with the front side of the mounting member by welding, and a rear end of the rear portion of the second supporting member is fixed with the front side of the mounting member by welding.

\* \* \* \* \*